No. 768,800. PATENTED AUG. 30, 1904.
S. C. HITCHCOCK.
SPLIT PULLEY.
APPLICATION FILED MAY 11, 1903.
NO MODEL.

WITNESSES:
Fred J. Shaw
Ramsey Farley

Solomon C. Hitchcock
INVENTOR.
BY T. J. Elliott
HIS ATTORNEY.

No. 768,800.                                                           Patented August 30, 1904.

UNITED STATES PATENT OFFICE.

SOLOMON C. HITCHCOCK, OF TACOMA, WASHINGTON, ASSIGNOR OF ONE-HALF TO C. O. BOSSE AND CHARLES H. MORSE, OF TACOMA, WASHINGTON.

SPLIT PULLEY.

SPECIFICATION forming part of Letters Patent No. 768,800, dated August 30, 1904.

Application filed May 11, 1903. Serial No. 156,614. (No model.)

*To all whom it may concern:*

Be it known that I, SOLOMON C. HITCHCOCK, a citizen of the United States, residing at Tacoma, in the county of Pierce and State of Washington, have invented a new and useful Improvement in Split Pulleys, of which the following is a specification.

My invention relates to that class of pulleys which are made in two halves and which can be connected together and clamped to the shaft at any point thereon without dismounting the shaft, and has for its objects, first, the simplification of the device, thus reducing its cost and also making it easy and convenient to assemble; second, the symmetrical arrangement of the parts, thus preventing any tendency to twist out of line; third, the centering of the pulley on the shaft independently of the clamping device.

I attain these objects by the devices illustrated in the accompanying drawings, in which—

Figure 1:
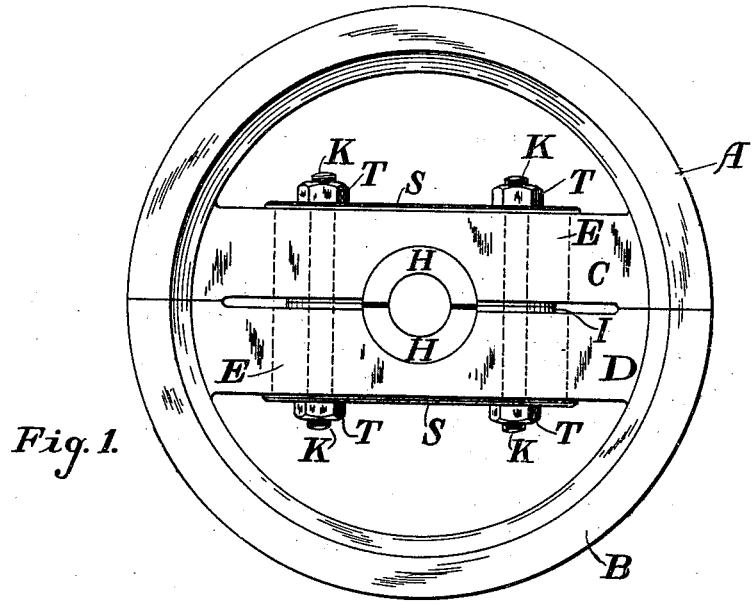
Figure 2:
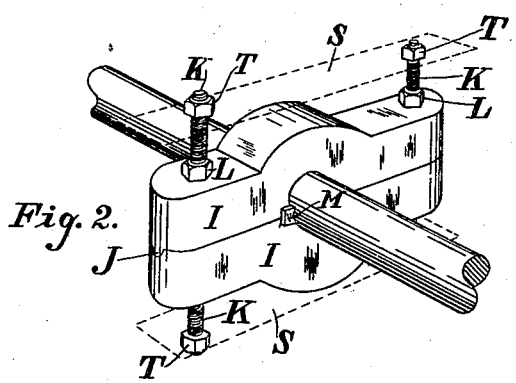
Figures 3, 4:
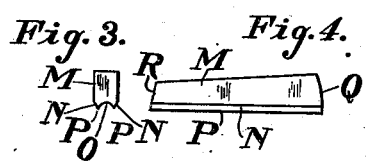
Figure 5:
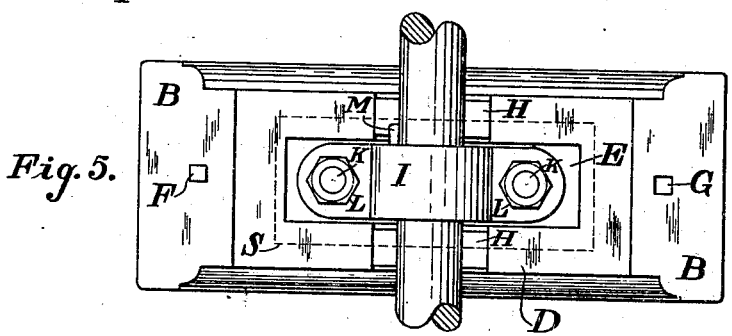

Figure 1 is a side elevation of the pulley. Fig. 2 is a perspective view of the clamp. Fig. 3 is an end view of the wedge or key. Fig. 4 is a side view thereof. Fig. 5 is a plan of the pulley with one section thereof removed.

Similar letters of reference refer to similar parts throughout the several views.

The parts A and B represent the semicircular rims of the ordinary split wood pulley. The ends of these rims are joined in the usual manner by the straight cross-pieces C and D, respectively. The centers of these parts C and D are cut away to form the vertical elongated slots E, as shown in Fig. 5, in which the hereinafter-described clamping device is secured. The parts A and B are each provided with a dowel-pin F and a hole G, whereby the parts when once trimmed true will assume the same relative position every time that they are set upon the shaft. The parts C and D are bored along the center line of the pulley to receive the centering-bushings H. Two pairs of these bushings are provided, one pair on each side of above-described slot E. Each pair of bushings fits accurately into the above-described bore in the parts C or D and are accurately bored to fit the shaft on which the pulley is to be mounted. A pair of bushings do not quite close around the shaft, but a small space is left between them. These bushings accurately center the pulley on the shaft entirely independent of the device for clamping the pulley to the shaft and are not intended to act as a clamp on the shaft, though they no doubt do exert a slight clamping force thereon when the parts C and D are firmly bolted together.

The clamping device consists of a pair of castings I, shaped similar to that shown in Fig. 2 and small enough to enter the slot E and be entirely enveloped by the sides thereof. The parts I fit snugly together and are provided with a tongue and groove J (see Fig. 2) or with any similar device whereby the said parts I are kept from lateral relative movement, but are allowed a small longitudinal relative movement. The bolts K pass loosely through holes in the parts I and are threaded at both ends and sufficiently long to extend beyond the parts I and a short distance beyond the slot E. The nuts L screw on the bolts K to secure the parts I together. A key-seat is provided in the clamp in any suitable position. I prefer, however, to place it partly in each piece I. The outer surface of the key-seat is inclined, so that the hereinafter-described wedge-shaped key will engage it practically along its entire length. The pieces I are bored for the shaft to which the pulley is to be attached.

The key M is longitudinally of a generally wedge shape, but I prefer to shape its ends and inner surface in the following manner: The lower edges are beveled off to form the inclined sides N, and the groove O extends the full length of the lower side of the wedge M between the sides N, thus forming the sharp cutting edges P, adapted to cut into the shaft when driven into place. The rear or higher end Q of the wedge is inclined forward, as shown in Fig. 4, to receive the blows of the driving-hammer, and the forward end R is inclined backward, so that the forward ends of the edges P will cut more readily into the shaft. If necessary, the bushings H are cut away, so as not to interfere with the key.

The two plates S are adapted to rest on the inner faces of the parts C and D and are made sufficiently large to entirely cover over the slot E and to have a sufficient bearing-surface on the parts C and D. The bolts K pass through holes provided in these plates S, and the nuts T screw on the bolts K and down to the plates S, securely fastening each part A and B independently to the clamp I.

My pulley is assembled in the following convenient manner: The portion of the shaft to which the pulley is to be secured having been selected, the parts I are placed on the shaft at that point and are securely fastened together by means of the bolts K and the nuts L. Then the key M is driven into the key-slot in said parts I, the edges P cutting into the shaft and clamping the parts I to the shaft. Then one of the parts A or B is placed so that the slot E covers one piece I, the bolts K projecting through the slot E. One plate S is then placed over the slot, the bolts K passing through the holes therein provided, and then the nuts T are screwed tightly down on the plate S, securely fastening the part A or B to the clamp. Then the other part A or B is similarly secured to the clamp. It is not necessary that the line between the clamping-pieces I shall be parallel with that between C and D, though that will be the usual way of setting the pulley up. A slight variation one way or the other will make no difference.

It will be readily seen that my pulley is symmetrical, and therefore is not liable to be forced out of line. Also the pulley parts are bolted together over the shaft, and the bushings so control the position that it is forced to be concentric with the shaft; also, that the bolts which fasten the pulley parts together also fasten the clamp parts together. The extreme simplicity is indicated by the fact that in the whole device there are only five main parts with two bolts and four nuts.

What I claim, and desire to secure by Letters Patent, is—

In a split pulley, the combination with the shaft, of a pair of castings adapted to engage a keyway formed between them at their point of joining, a wedge-shaped key having cutting edges on one side adapted to be driven into said keyway between the castings and the shaft the cutting edges thereof engaging said shaft whereby said castings are wedged to said shaft and are prevented from slipping around said shaft, bolts passing loosely through holes in said castings and adapted to fasten said castings together and extending in both directions beyond said castings, bushings mounted on said shaft at each side of said castings, a pair of separable pulley parts fitting on said bushings and surrounding but not engaging said castings, and plates engaging said pulley parts and having said bolt extensions passing through them with nuts on said bolts whereby said pulley parts are secured together and to the castings.

In testimony whereof I have signed my name to this specification in the presence of two subscribing witnesses.

S. C. HITCHCOCK.

Witnesses:
A. H. DENMAN,
FREDERIC J. SHAW.